United States Patent
Ahlquist

(10) Patent No.: US 12,534,303 B2
(45) Date of Patent: Jan. 27, 2026

(54) SOUND ATTENUATED CONVEYOR ROLLER ASSEMBLY

(71) Applicant: Dematic Corp., Grand Rapids, MI (US)

(72) Inventor: Eric Ahlquist, Belding, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 18/422,775

(22) Filed: Jan. 25, 2024

(65) Prior Publication Data
US 2024/0217750 A1  Jul. 4, 2024

Related U.S. Application Data

(63) Continuation of application No. 18/325,368, filed on May 30, 2023, now Pat. No. 11,891,252.

(60) Provisional application No. 63/478,226, filed on Jan. 3, 2023.

(51) Int. Cl.
*B65G 39/06* (2006.01)
*B65G 39/07* (2006.01)

(52) U.S. Cl.
CPC .......... *B65G 39/07* (2013.01); *B65G 2207/32* (2013.01)

(58) Field of Classification Search
CPC ..... B65G 39/06; B65G 39/07; B65G 2207/32
USPC ..................................................... 492/28, 56
See application file for complete search history.

(56) References Cited

U.S. PATENT DOCUMENTS

| | | |
|---|---|---|
| 3,705,455 A | 12/1972 | Lovett |
| 3,724,643 A | 4/1973 | Kohl |
| 4,312,444 A | 1/1982 | Mushovic |
| 4,453,848 A | 6/1984 | Adkisson et al. |
| 5,865,290 A | 2/1999 | Scott |
| 6,142,922 A * | 11/2000 | Yoshikawa ........ G03G 15/1685 492/59 |
| 6,820,736 B2 | 11/2004 | Itoh et al. |
| 7,028,825 B2 | 4/2006 | Scott |

(Continued)

FOREIGN PATENT DOCUMENTS

| | | |
|---|---|---|
| AT | 388718 B | 8/1989 |
| DE | 202009012644 U1 | 12/2009 |

(Continued)

OTHER PUBLICATIONS

Web pages from https://www.kastalon.com/koat-a-roll-products/, accessed as early as Sep. 17, 2019.

(Continued)

*Primary Examiner* — Douglas A Hess
(74) *Attorney, Agent, or Firm* — Gardner, Linn, Burkhart & Ondersma LLP

(57) ABSTRACT

A sound attenuated conveyor roller assembly reduces the noise or vibration produced by the conveyor roller assembly during operation, and includes a conveyor roller having a cylindrical portion to which a sound damper may be coupled. The conveyor roller may include an unreduced outer surface and a reduced outer surface, in which the sound damper is disposed at the reduced outer surface such that an outer surface of the damper and the unreduced outer surface of the conveyor roller are located at substantially equal radial distances from a longitudinal axis of the conveyor roller. A tapered end connector having a tapered plastic tip may be coupled to each end of the conveyor roller to further reduce noise and vibration in the conveyor roller assembly.

30 Claims, 14 Drawing Sheets

(56) References Cited

U.S. PATENT DOCUMENTS

| | | | |
|---|---|---|---|
| 7,846,081 | B2 | 12/2010 | Itoh et al. |
| 8,727,105 | B2 | 5/2014 | Scott et al. |
| 11,091,321 | B2 | 8/2021 | Dorok et al. |
| 11,891,252 | B1 * | 2/2024 | Ahlquist ................ B65G 39/07 |
| 2005/0244200 | A1 | 11/2005 | Kanamori et al. |
| 2006/0180426 | A1 | 8/2006 | Scott |
| 2021/0097968 | A1 | 4/2021 | Ahlquist et al. |
| 2023/0123861 | A1 | 4/2023 | Ahlquist et al. |

FOREIGN PATENT DOCUMENTS

| | | |
|---|---|---|
| JP | S5015329 Y1 | 5/1975 |
| JP | S52122482 U | 9/1977 |
| JP | S5326084 U | 3/1978 |
| JP | S5393890 U | 7/1978 |
| JP | S5617212 U | 2/1981 |
| JP | H11180533 A | 7/1999 |
| WO | 2014114963 A2 | 7/2014 |

OTHER PUBLICATIONS

Web pages from https://www.megasorber.com/4fold-approach/vibration-damping, accessed as early as Sep. 17, 2019.
International Search Report and Written Opinion from corresponding Patent Cooperation Treaty (PCT) Application No. PCT/IB2023/063352, completed Feb. 28, 2024 and mailed Apr. 11, 2024.
Search Report from corresponding European patent application No. 23864103.9 dated Sep. 9, 2025.

* cited by examiner

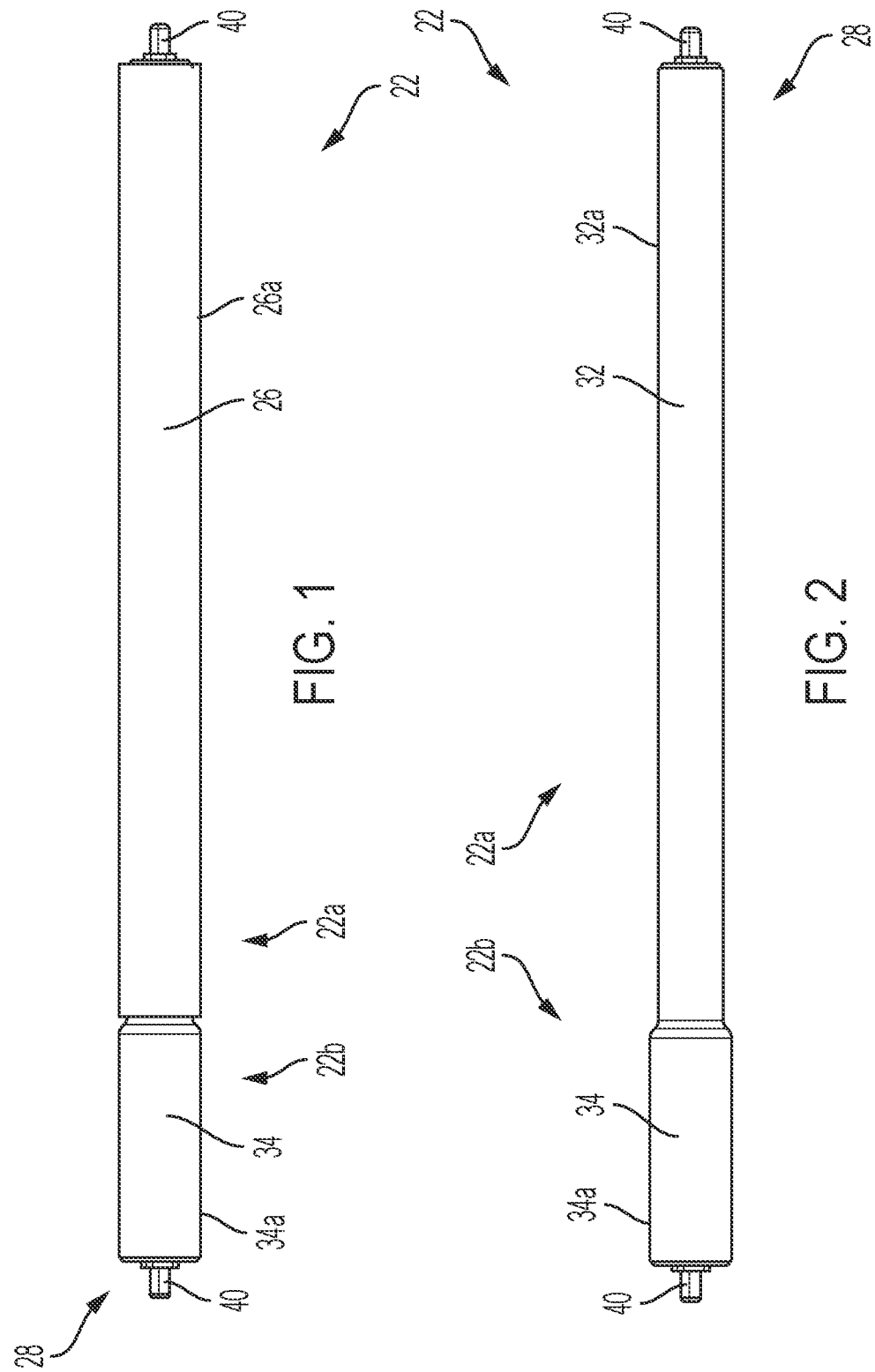

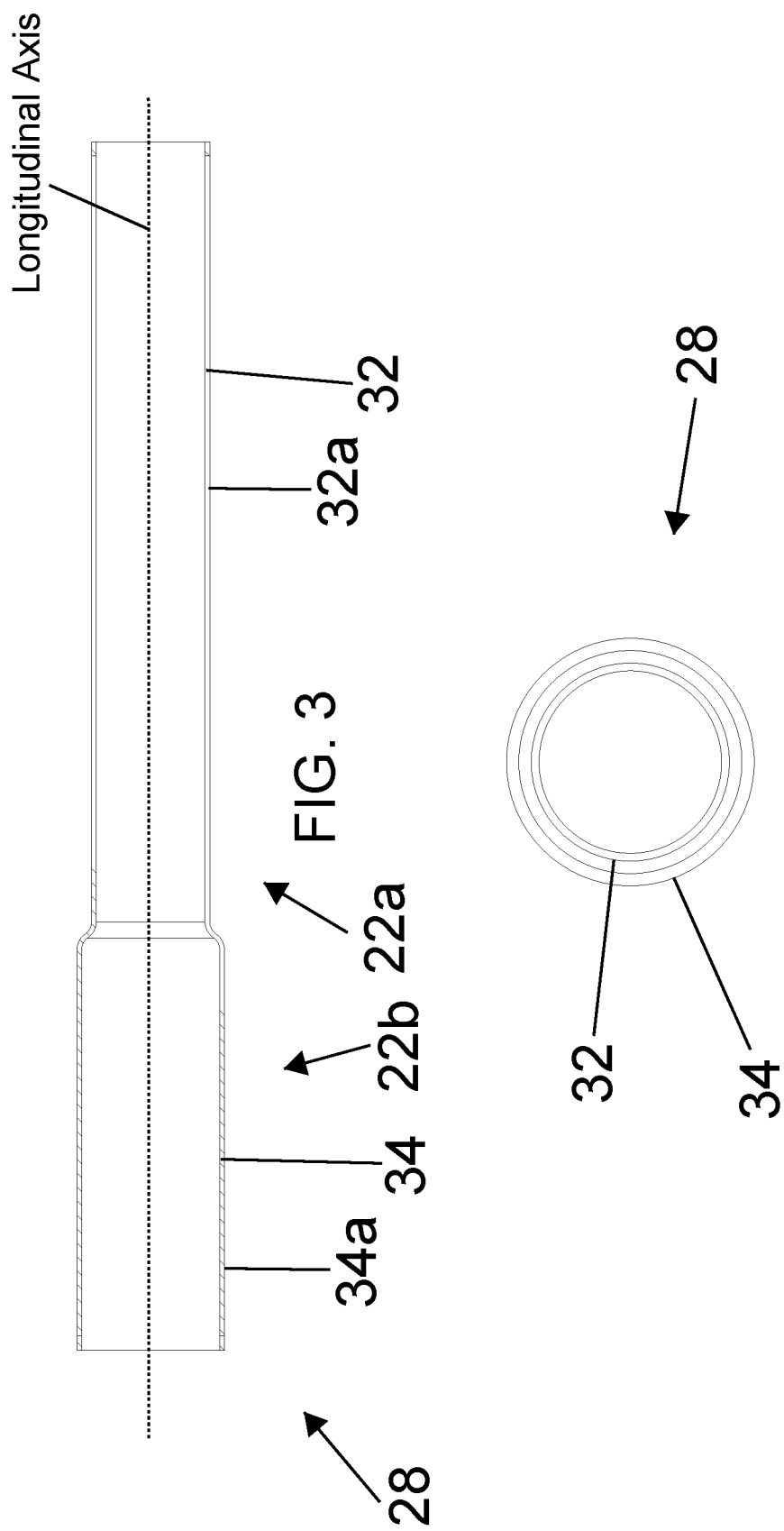

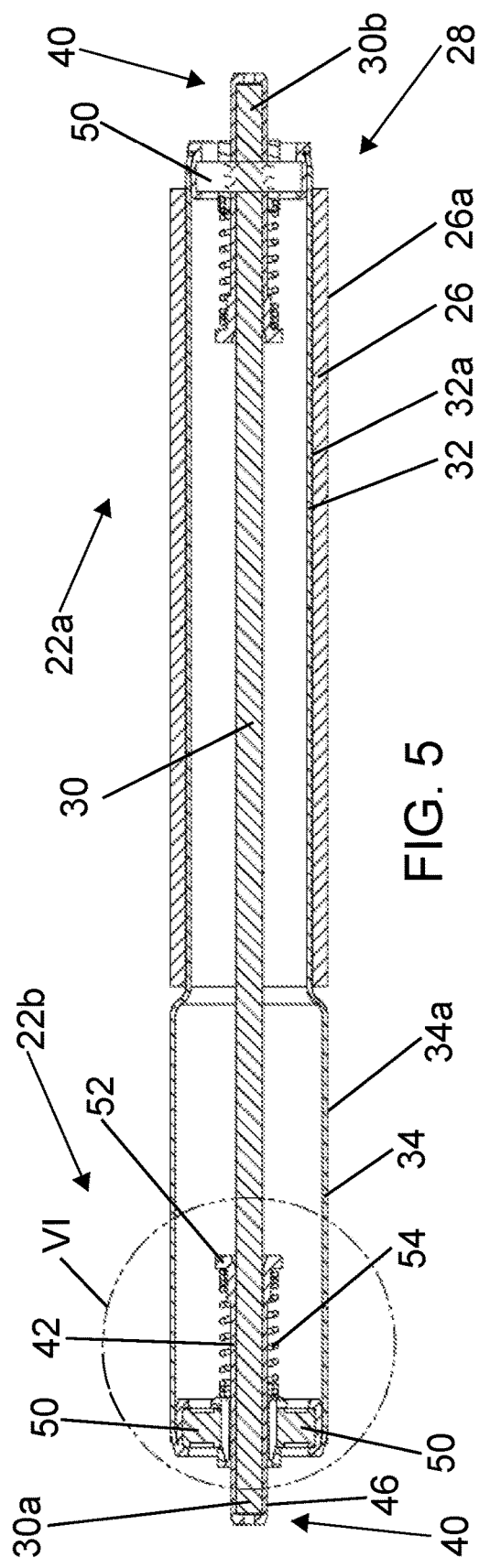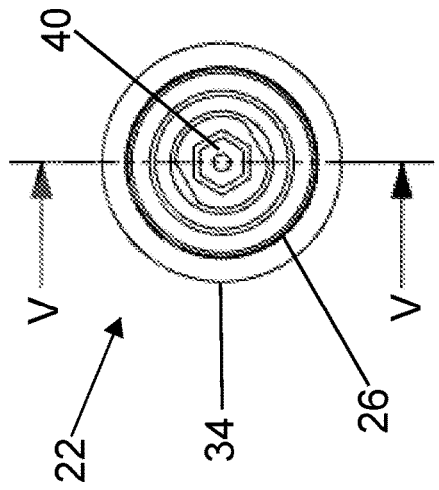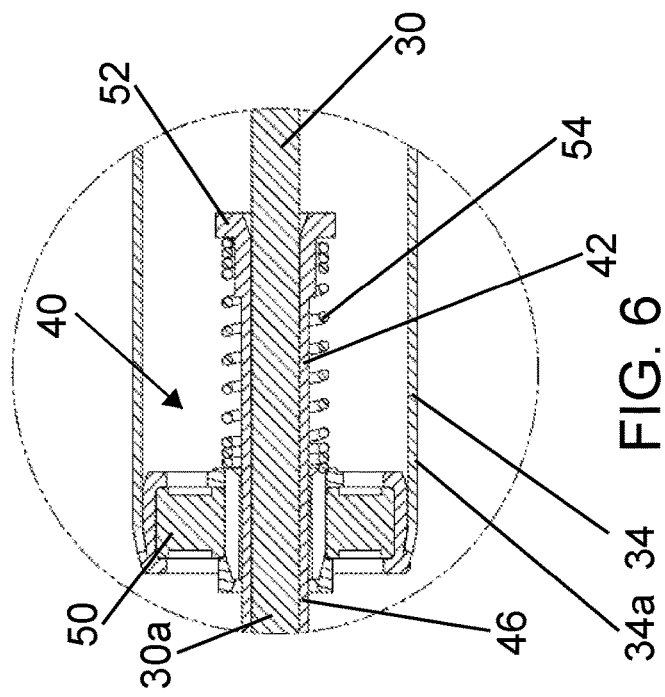
FIG. 5
FIG. 7
FIG. 6

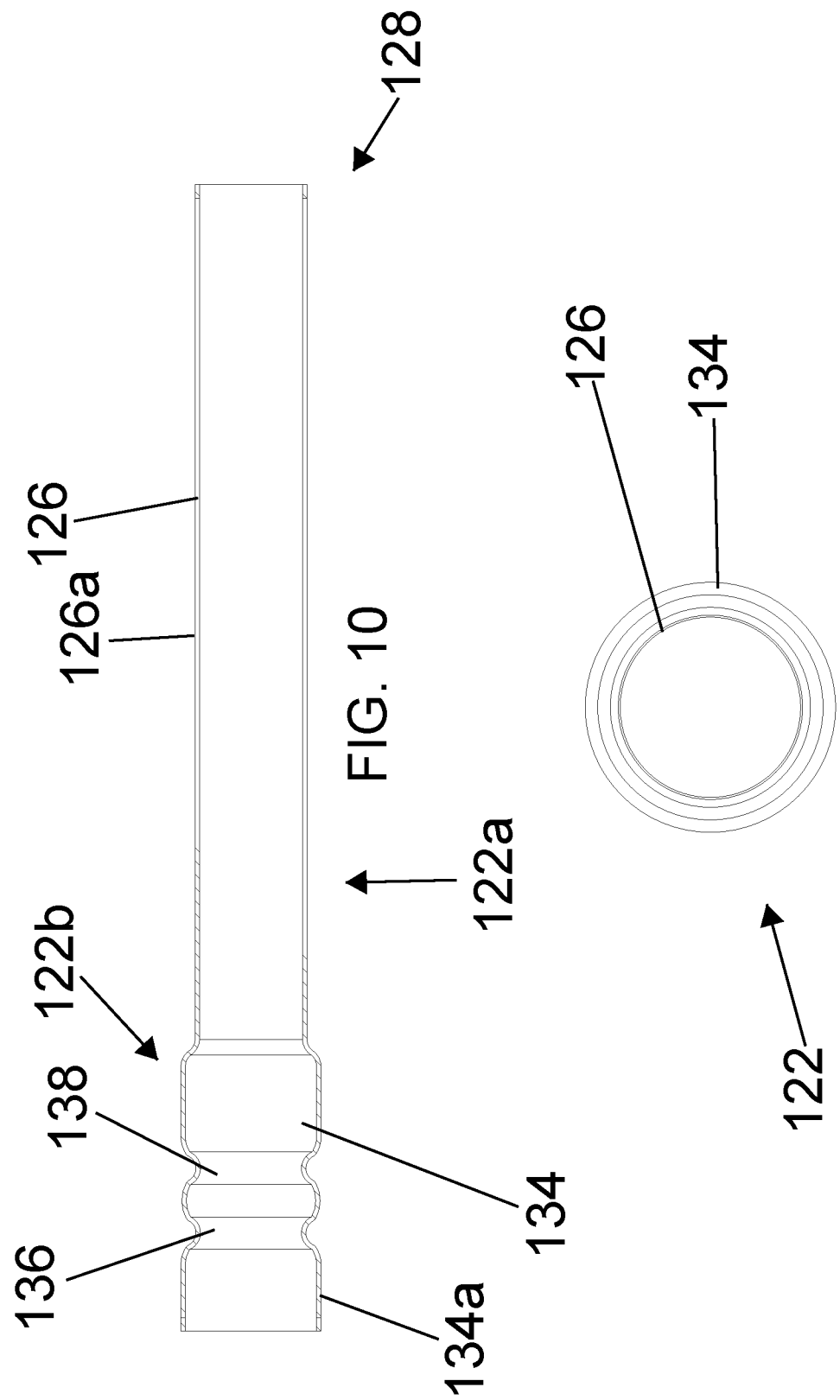

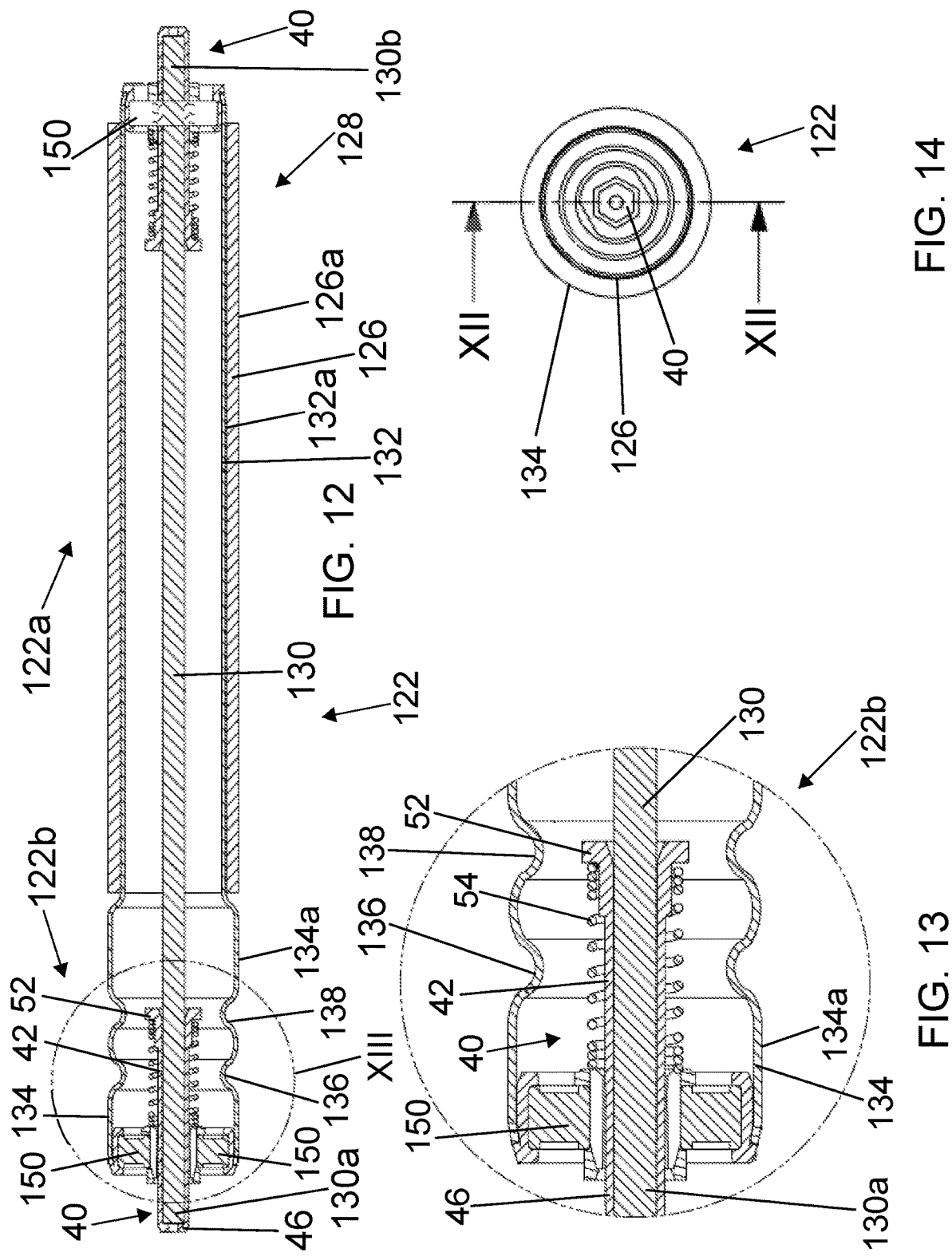

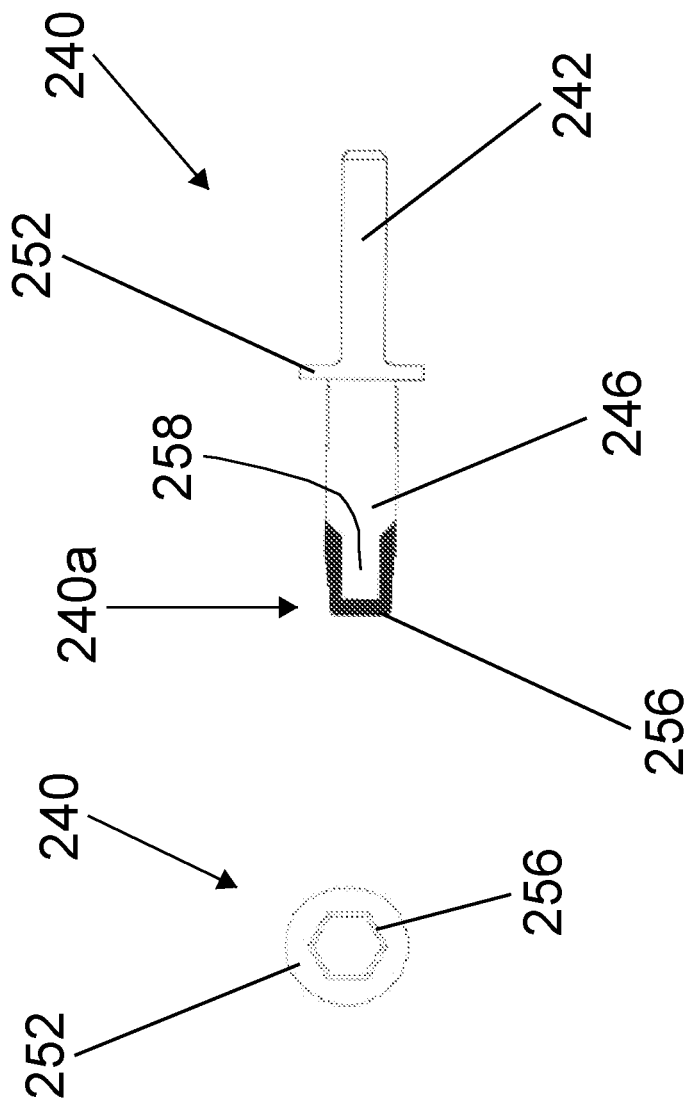

SOUND ATTENUATED CONVEYOR ROLLER ASSEMBLY

CROSS REFERENCE TO RELATED APPLICATIONS

The present application is a continuation of U.S. application Ser. No. 18/325,368, filed May 30, 2023, now U.S. Pat. No. 11,891,252 issued Feb. 6, 2024, which claims benefit of U.S. provisional application Ser. No. 63/478,226, filed Jan. 3, 2023, which are both hereby incorporated herein by reference in their entireties.

FIELD OF THE INVENTION

The present invention is directed to sound attenuation in material handling systems, and more particularly for sound attenuation of rollers for conveyors and material handling systems for order item processing.

BACKGROUND OF THE INVENTION

Material handling operations may produce significant noise due to various causes, including vibration produced during the operation and manipulation of components, such as conveyor rollers, of material handling systems. Noise sources may include ringing in conveyor rollers due to vibrations and rattling in/at the rollers and objects making impact with the rollers. High levels of noise may be undesired by workers and other persons in close proximity to the material handling systems.

SUMMARY OF THE INVENTION

The sound attenuated conveyor roller assembly according to an aspect of the present invention is adapted to reduce the noise or vibration produced by the assembly during operation. One or more conveyor rollers of the conveyor roller assembly or assembly may be outfitted with a sound damper made of a sound/vibration damping material, and/or may include a tapered end roller connector having a plastic tip, in which the tapered end connector is inserted into a mounting hole of the conveyor assembly frame. A portion of an outer diameter of the roller may be reduced by a certain amount for purposes of accommodating the sound damper. When the sound damper is added to this portion of the roller, the effective outer diameter of this portion of the roller with the added sound damper is substantially the same as the diameter of this portion of the roller before it was reduced, and is substantially the same diameter as a portion of the roller that was not reduced. Therefore, rollers with and without sound dampers may have the same outer dimensions relative to one another. Accordingly, a pitch distance between the rollers may remain the same as a conventional, non-sound damped roller conveyor even after the sound dampers have been added to the rollers.

According to one form of the present invention, a sound attenuated conveyor roller assembly includes a conveyor roller having a cylindrical body with an outer surface, and a sound damping sleeve made of a sound damping material configured to attenuate vibration at the conveyor roller during operation of the conveyor roller assembly. The sound damping sleeve coupled circumferentially around the conveyor roller and covering a majority of the outer surface of the conveyor roller. Optionally, the sound damping sleeve is made of polypropylene.

In one aspect, the outer surface is an unreduced outer surface, and the conveyor roller further includes a reduced outer surface located at a lesser radial distance from a longitudinal axis of the conveyor roller than the unreduced outer surface. The sound damping sleeve is coupled at the reduced outer surface.

In another aspect, the sound damping sleeve has an annular cross section with a wall thickness of approximately 3/16 of an inch.

In yet another aspect, the conveyor roller assembly includes a second conveyor roller having a second longitudinal axis. The conveyor roller is a first conveyor roller that has a first longitudinal axis, in which the first longitudinal axis is spaced approximately 2 inches from the second longitudinal axis.

In still another aspect, the conveyor roller has a grooved portion located longitudinally outboard of the sound damper.

In a further aspect, an end connector with a tapered end portion couples the conveyor roller to the conveyor roller assembly. Optionally, the tapered end portion has a plastic tip configured to reduce vibration between the conveyor roller and the conveyor roller assembly.

In yet a further aspect, a resilient member biases the end connector outwardly towards a side wall of the conveyor roller assembly.

In still another aspect, the tapered end portion has a hexagonal-shaped cross-sectional area. Optionally, the tapered end portion includes a metallic inner support with spaced-apart supportive ribs about which the plastic tip is disposed.

According to another form of the present invention, a sound attenuated conveyor roller assembly has a conveyor roller with a cylindrical body having an unreduced outer surface and a reduced outer surface. A sound damper with a damper outer surface is made of a sound damping material configured to attenuate vibration at the conveyor roller during operation of the conveyor roller assembly. The sound damper is disposed at the reduced outer surface.

In one aspect, the damper outer surface and the unreduced outer surface are located at substantially equal radial distances from a longitudinal axis of the conveyor roller.

In another aspect, the sound damper covers a majority of the reduced outer surface.

In a further aspect, an end connector has a tapered end portion configured to couple the conveyor roller to the conveyor roller assembly. The tapered end portion has a hexagonal-shaped plastic tip.

According to a method of the present invention, a sound attenuated conveyor roller for a conveyor assembly, is produced by reducing a diameter of a damper portion of a cylindrical conveyor roller by a thickness that is twice as thick as a wall thickness of a cylindrical sound damper; coupling the sound damper at the damper portion, in which the sound damper is made of sound damping material; and operably coupling the conveyor roller into the conveyor assembly.

In one aspect, the sound damper is circumferentially coupled about an outer surface of the damper portion.

In another aspect, the sound damper is formed by molding and extruding sound damping material.

In yet another aspect, the conveyor roller is operably coupled to the conveyor assembly at a position in which a longitudinal axis of the conveyor roller is approximately 2 inches away from a longitudinal axis of an adjacent conveyor roller.

Accordingly, the present invention provides a sound attenuated conveyor roller for use in reducing or quieting the noise and/or vibration present during the operation of a conveyor roller assembly. To accommodate the addition of a sound damper to the conveyor roller without increasing the outer diameter of the conveyor roller, a portion of the outside diameter of the conveyor roller where the sound damper will be coupled to the conveyor roller is reduced or "necked down". Thus, the addition of the sound damper to the conveyor roller does not increase the outer dimensions of the conveyor roller, and therefore does not require the pitch distance between adjacent conveyor rollers to be changed.

These and other objects, advantages, purposes and features of the present invention will become apparent upon review of the following specification in conjunction with the drawings.

BRIEF DESCRIPTION OF THE DRAWINGS

FIG. 1 is a side elevation view of a variable diameter conveyor roller with a sound damper disposed on the exterior of the roller, in accordance with the present invention;

FIG. 2 is another side elevation view of the roller of FIG. 1, shown with the sound damper omitted;

FIG. 3 is a cross-sectional view of the roller of FIG. 2, shown with end attachment portions omitted;

FIG. 4 is an end elevation view of the roller of FIG. 3;

FIG. 5 is a cross-sectional view of the roller of FIG. 1 taken along the line of V-V of FIG. 7;

FIG. 6 is an enlarged view of the area of the roller designated "VI" in FIG. 5;

FIG. 7 is an end elevation view of the roller of FIG. 1;

FIG. 10 is a cross-sectional view of the grooved roller of FIG. 9, shown with end attachment portions omitted;

FIG. 11 is an end elevation view of the grooved roller of FIG. 10;

FIG. 12 is a cross-sectional view of the roller of FIG. 8 taken along the line of XII-XII of FIG. 14;

FIG. 13 is an enlarged view of the area of the grooved roller designated "XIII" in FIG. 12;

FIG. 14 is an end elevation view of the grooved roller of FIG. 8;

FIG. 18 is an end elevation view of the tapered end connector of FIG. 17;

FIG. 19 is a side elevation view of the tapered end connector of FIG. 17, shown with a portion of the tapered end cut away to reveal an internal support structure;

DETAILED DESCRIPTION OF THE PREFERRED EMBODIMENTS

Figure 8:
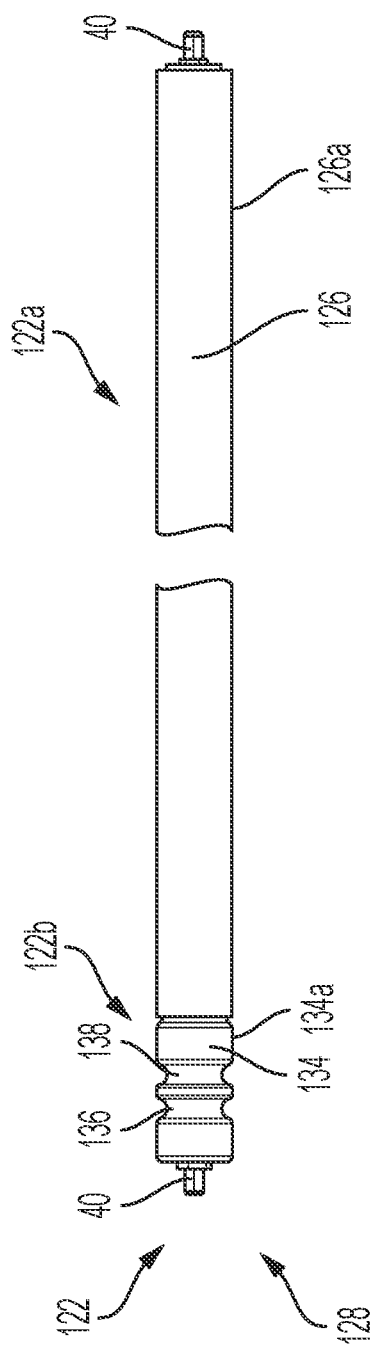
FIG. 8 is a side elevation view of a variable diameter grooved conveyor roller with a sound damper disposed on the exterior of the roller, in accordance with the present invention.
Figure 9:
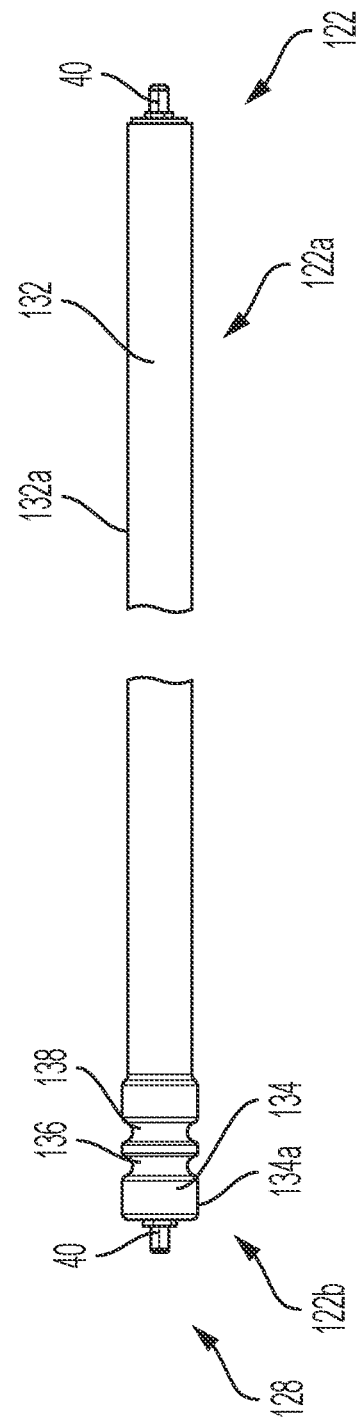
FIG. 9 is another side elevation view of the grooved roller of FIG. 8, shown with the sound damper omitted.
Figure 15:
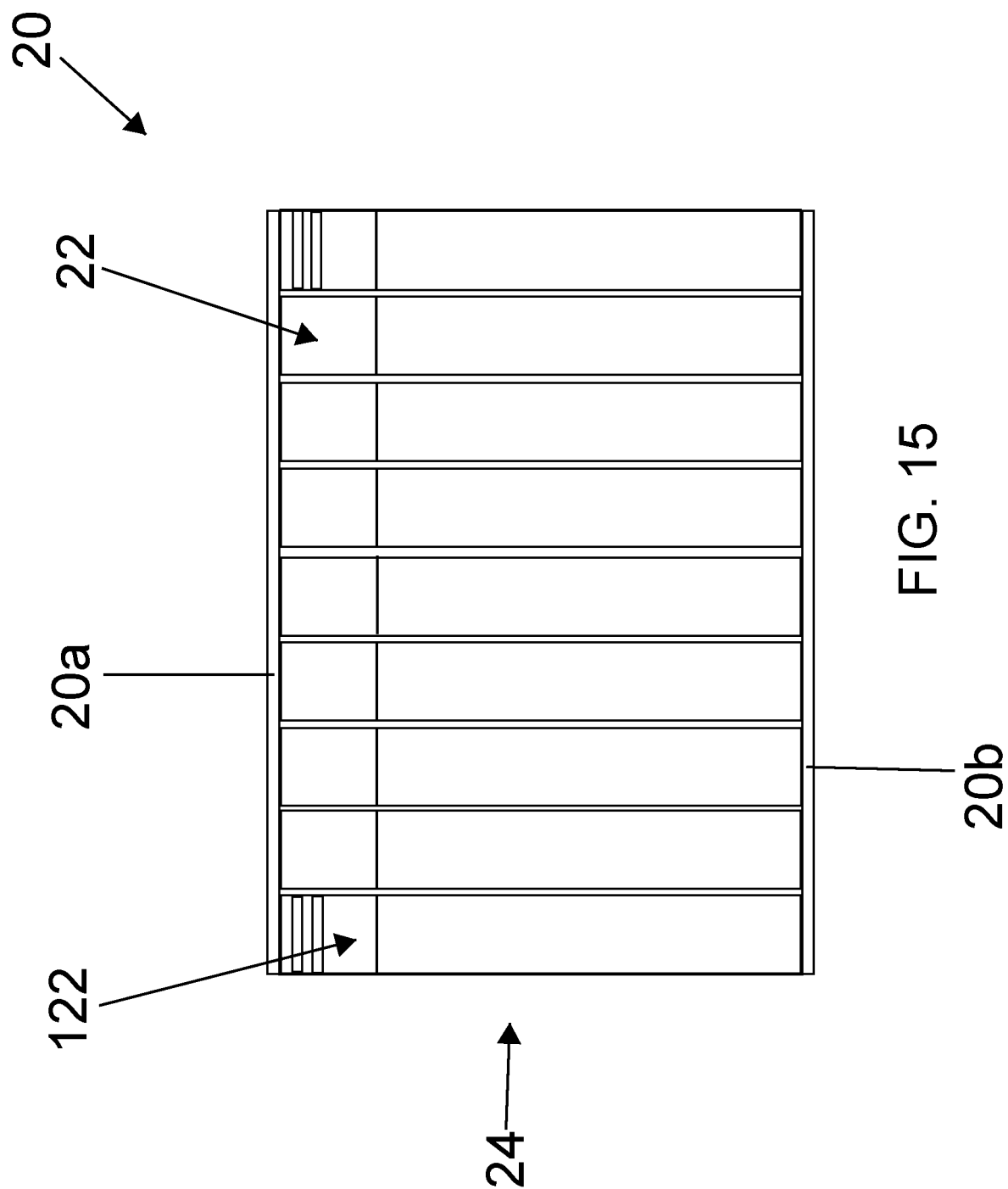
FIG. 15 is a top plan view of a conveyor roller assembly.
Figure 16:
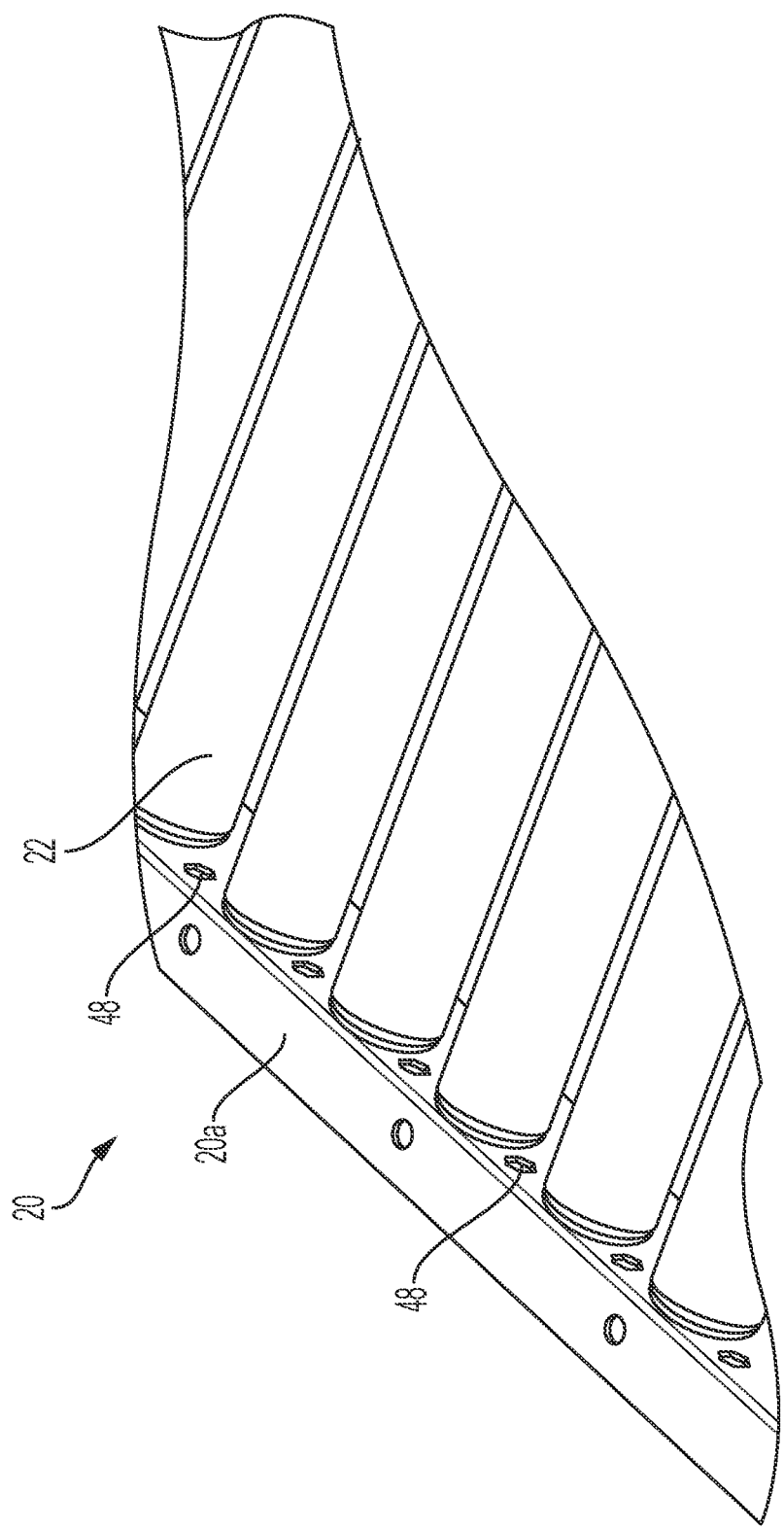
FIG. 16 is an enlarged perspective view of the conveyor roller assembly of FIG. 15 showing a series of rollers attached to a side wall of the conveyor roller assembly.
Figure 17:
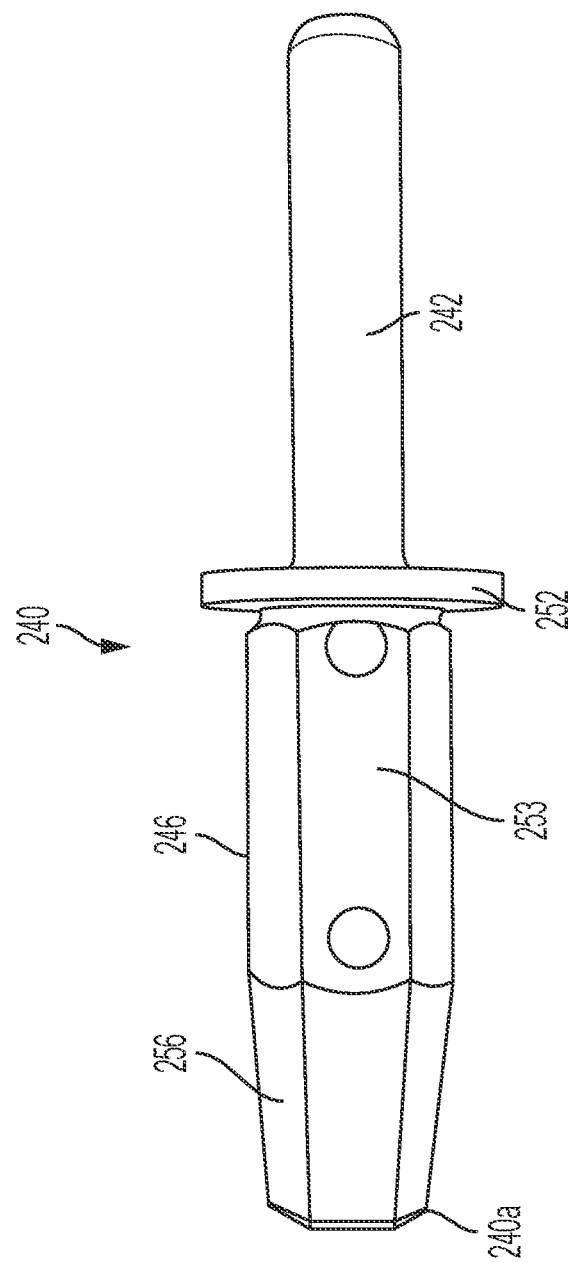
FIG. 17 is a side elevation view of a tapered end connector with a plastic tip in accordance with a further aspect of the present invention.

Referring now to the drawings and illustrative embodiments depicted therein, a sound attenuated or damped conveyor roller assembly is provided for reducing sound during operation of conveyor type material handling systems. A conveyor roller system includes one or more conveyor assembly 20 (FIGS. 15 and 16) having a series of conveyor rollers 22. During the operation of conveyor assembly 20, rollers 22 are driven and/or passively rotate to convey, move, support, and transport an object such as a package along a conveyor surface 24. Excessive noise and vibration—which may be unpleasant or undesired to an operator of conveyor assembly 20 or other persons nearby—may be generated during the operation of conveyor assembly 22. For example, unwanted noise may be produced due to objects coming into contact with rollers 22 while rollers 22 are being driven, or as a result of rotation of rollers 22 themselves. With reference to FIGS. 1-7, rollers 22 are outfitted with a sound damper 26 made of a sound damping material to reduce the level of noise and/or vibration resulting from the operation of conveyor assembly 20. To accommodate sound damper 26, an outer diameter of a damper portion 22a of roller 22 is reduced to form a reduced outer diameter portion 32. Sound damper 26 may then be added to the outer or exterior surface 32a of the reduced outer diameter portion 32, in which an outer diameter of sound damper 26 at reduced portion 32 is the same in diameter as an unreduced outer diameter portion 34 located at an undamped portion 22b of roller 22. The unreduced outer diameter portion 34 represents the initial exterior surface and outer diameter of a conventional conveyor roller. Thus, the pitch spacing or pitch distance between adjacent damped rollers 22 need not be changed to compensate for the added thickness of sound damper 26 after it has been added to the outer diameter of roller 22.

A variable or dual diameter roller in the form of roller 22 includes a cylindrical portion or body 28 that is coupled to an axle 30 defining outer connecting portions 40 (FIGS. 5 and 6). As will be described in more detail below, axle 30 may be coupled to frame side walls 20a, 20b of conveyor assembly 20 to operably couple roller 22 to conveyor assembly 20 such that roller 22 is rotatable about its longitudinal axis. Cylindrical portion 28 includes damper portion 22a, which may include reduced outer diameter portion 32 having the reduced outer or exterior surface 32a, and undamped portion 22b, which includes the unreduced outer diameter portion 34 having an unreduced outer or exterior surface 34a. All of cylindrical portion 28, damper portion 22a, undamped portion 22b, reduced portion 32, and unreduced portion 34 are concentrically aligned about a longitudinal axis (FIG. 3) of roller 22. Reduced portion 32 has a smaller outer diameter compared to unreduced portion 34. That is, the radius of reduced portion 32 is smaller than the radius of unreduced portion 34 by a certain distance or thickness, which may be designated as a reduced thickness. In particular, the reduced thickness is the difference between the radii of unreduced portion 34 and reduced portion 32, in which the radii are measured from the longitudinal axis to outer surfaces 34*a* and 32*a*, respectively. In the illustrated embodiment, reduced portion 32 makes up a majority of cylindrical portion 28. However, it should be appreciated that a reduced portion could make up more or less of a cylindrical portion apart from what is shown in the illustrated embodiment.

Figures 23A, 23B:
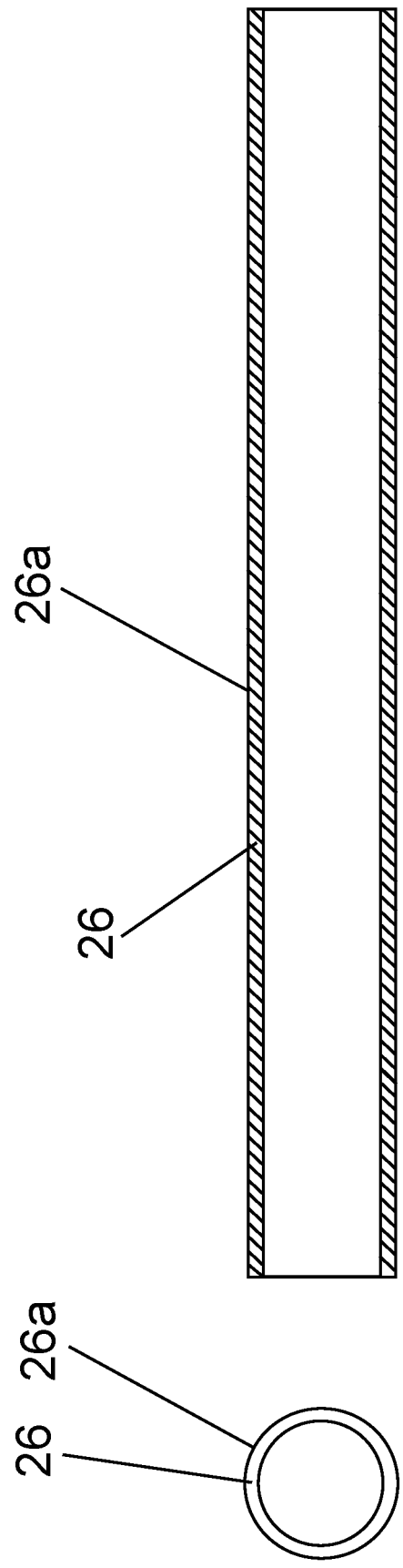
FIG. 23A is an end elevation view of the sound damper of FIG. 1.
FIG. 23B is a cross-sectional view of the sound damper of FIG. 23A.

Sound damper 26 may be made of a vibration damping or vibration reducing material such as a plastic, for example, polypropylene, to thereby dampen, attenuate, quiet, and/or lessen noise produced during operation of conveyor assembly 20. Additionally, the sound damping material of sound damper 26 may alternatively include or incorporate one or more other at least partially resilient materials having sound damping properties, such as polyurethane, vinyl, mass-loaded vinyl, or the like. In the illustrated embodiments of FIGS. 23A and 23B, sound damper 26 is a cylindrical or elongate annular-shaped sleeve, casing, or cover that includes a damper outer surface 26*a* and that has a wall thickness that is substantially equivalent to the reduced thickness discussed above. Sound damper 26 may be disposed, positioned, affixed, or otherwise coupled to roller 22 to substantially or entirely cover reduced outer surface 32*a*. It is preferable that sound damper 26 is coupled to reduced portion 32 such that sound damper 26 is in continuous contact with reduced portion 32, which may provide a maximum benefit from the sound damping characteristics of sound damper 26. Additionally, although not required, it is preferable that sound damper 26 cover a majority of cylindrical portion 28.

Because the wall thickness of damper 26 is substantially equivalent to the reduced thickness, outer surface 26*a* of sound damper 26 is substantially even with or flush with unreduced outer surface 34*a* of unreduced portion 34 when sound damper 26 is coupled to reduced portion 32 of roller 22. That is, sound damper 26 has a substantially uniform outer diameter that is equivalent to the outer diameter of unreduced portion 34, such that damper outer surface 26*a* and unreduced outer surface 34*a* are located at a substantially equal radial distance from the longitudinal axis of roller 22. In the illustrated embodiment, sound damper 26 has a wall thickness of approximately $3/16$ of an inch. Accordingly, the reduced radial thickness of roller 22 is also approximately $3/16$ of an inch. However, it should be appreciated that both a reduced radial thickness of the roller and/or a damper wall thickness may vary from $3/16$ of an inch. Additionally, as shown in the illustrated embodiment, sound damper 26 is coupled to roller 22 such that sound damper 26 covers substantially all of reduced portion 32. However, it should be understood that one or more sound dampers could be coupled to a conveyor roller in alternative ways.

As discussed above, sound damper 26 may be affixed to the exterior surface of conveyer roller 22 at damper portion 22*a* without increasing a maximum outer diameter of roller 22. As a result, the pitch spacing or pitch distance between each pair of adjacent rollers 22 in a conveyor assembly, such as conveyor assembly 20, need not be increased or otherwise adjusted to accommodate the addition of sound damper 26 to roller 22. Therefore, sound attenuated roller 22 outfitted with sound damper 26 may be conveniently added as a retrofit component to conveyor assembly 20 without needing to adjust or alter the prior pitch spacing between adjacent rollers 22. Alternatively, existing rollers 22 in conveyor assembly 20 may be removed from conveyor assembly 20 and adjusted (discussed in further detail below) to accommodate sound dampers 26 before being fitted back into conveyor assembly 20 with sound dampers 26 affixed to the exterior of rollers 22. In addition to retrofit applications, roller 22 outfitted with sound damper 26 may be incorporated into a new conveyor assembly as well. It should be understood that the pitch spacing is the distance between a pair of adjacent longitudinal axes of adjacent rollers 22, and that the pitch spacing in the illustrated embodiment is approximately 2 inches. It may be of potential benefit to maintain a relatively lesser pitch spacing, such as 2 inches, due to the potentially greater noise and/or vibration that may be produced during the operation of a conveyor assembly at a larger pitch spacing, such as a 3 inch pitch spacing, for example. Furthermore, altering the pitch spacing in a conveyor assembly that has been previously setup or configured for 2 inch pitch spacing between adjacent conveyor rollers may require additional time, labor, and expense.

A conveyor roller may be initially manufactured to as a variable diameter conveyor roller that includes a reduced portion, or alternatively may be manufactured with a cylindrical portion that only includes an unreduced outer diameter portion. In the latter case, the cylindrical portion may be subsequently changed or adapted to include a reduced outer diameter portion. In either case, there are various ways in which variable diameter conveyor roller may be manufactured, formed, or adjusted to include a reduced portion. For example, a die extrusion may be used to extrude, press, squeeze, or "neck down" the cylindrical body of the conventional roller from the unreduced outer diameter to the reduced outer diameter. In another example, various machines such as a lathe and/or computer numerical control (CNC) systems could be used to remove layers of material from a portion of a cylindrical portion that is desired to be a reduced portion. The roller may be necked down and/or material may be removed such that the outer diameter of the cylindrical portion at the desired damping portion is reduced by twice the amount of the wall thickness of the sound damper that is intended to be used. For example, if a sound damper having a wall thickness of $3/16$ of an inch is to be used, then the outer diameter of cylindrical portion 28 at the reduced portion should be reduced by approximately $3/8$ of an inch, such that the radius of cylindrical portion 28 is only reduced by approximately $3/16$ of an inch. It should be appreciated that a damper portion could be manufactured and/or machined to include more or less of the total cylindrical portion of a variable diameter conveyor roller apart from what is shown in the illustrated embodiment. Still further, a roller may incorporate sound attenuation material on an interior as disclosed in U.S. Pub. App. No. US2021/0097968A1, which is hereby incorporated herein by reference.

As previously noted, sound damper 26 is made of a sound and/or vibration damping material. Sound damper 26 may be manufactured in various ways, such as through a molding process, an extrusion process, a machining process, or a combination thereof. For example, during the manufacturing process, sound damper 26 may be molded into C-shaped sections that are later formed together to create an annular ring-shape. Alternatively, an injectable sound damping material, such as a foam, two-part epoxy, or rubber, may be injected or dispensed onto reduced portion 32 of roller 22. Additionally, sound damper 26 could be formed as a sheet of sound damping material, in which the sheet of damping material may be constrained to reduced portion 32 by an adhesive layer. The adhesive layer may be disposed at damping portion 22*a* on reduced outer surface 32*a*, and be supplied with a film to be removed with a sound damping material that is disposed and/or coupled on top of the adhesive layer. Alternatively, instead of providing an adhesive layer, an adhesive may be impregnated into the damping material. Furthermore, a resilient or constraining layer that provides structural stiffness and wear resistance to the damping material may also be incorporated into sound damper 26. In any embodiment, the additional thickness of a sound damper having an adhesive layer and/or constraining layer is accounted for to ensure the outer diameter of sound damper 26 and the diameter of the unreduced outer surface 34*a* are located an equal radial distance from the longitudinal axis of roller 22. After sound damper 26 has been coupled to reduced portion 32, the sound attenuated roller 22 may then be operably coupled into conveyor assembly 20. As noted above and if applicable, the original pitch spacing may be maintained between adjacent rollers 22 within conveyor assembly 20, if desired.

It will be appreciated that a conveyor roller may include any suitable roller component or assembly for use in a conveyor roller assembly, such as conveyor assembly 20. For example, with reference to FIGS. 8-14, a grooved conveyor roller 122 is shown that is similar to roller 22, with similar features of grooved roller 122 being designated with like reference numbers, but with "100" added to each reference number of grooved roller 122. Due to the similarities of grooved roller 122 relative to roller 22, not all of the components and features of grooved roller 122 are discussed herein. As shown, grooved roller 122 includes cylindrical portion 128 having a grooved portion with a pair of grooves 136, 138 at an undamped portion 122*b*, in which undamped portion 122*b* also includes an unreduced outer diameter portion 134 having an unreduced outer or exterior surface 134*a*. As shown, grooves 136, 138 are located longitudinally outboard of sound damper 26, and may be used to receive and partially constrain a tensioned drive belt or other cordage that is driven to thereby rotate grooved roller 122. Cylindrical portion 128 further includes a damping portion 122*a* with a reduced outer diameter portion 132 having a reduced outer or exterior surface 132*a*. Cylindrical portion 128 is coupled about an axle 130 having a pair of opposed end portions 130*a*, 130*b* which may be operably coupled to conveyor assembly 20, or any other suitable conveyor assembly. In a similar fashion as described above with regard to sound damper 26 and roller 22, a sound damper 126 may be coupled to damper portion 122*a* at reduced portion 132 to thereby attenuate vibration and/or sound that could be produced during the operation of a conveyor assembly that includes grooved roller 122. It should be appreciated that damping material may be positioned on or over grooves 136, 138 as desired for sound damping and rotational properties of grooved roller 122. It should also be appreciated that a sound damper could be incorporated into or manufactured with various other types of rollers and/or other equipment used in a conveyor assembly.

With reference to FIGS. 5-7, 15, and 16, conveyor roller 22 is rotatably coupled to frame side walls 20*a*, 20*b* of a conveyor assembly 20 via a pair of end connectors 40 having hollow elongate bodies 42 that are positioned over and/or receive opposing ends 30*a*, 30*b* of internal shaft or axle 30 of roller 22, such that each axle end 30*a*, 30*b* is encapsulated or covered by end connectors 40. End connectors 40 are also coupled to side walls 20*a*, 20*b*, to thereby couple roller 22 to conveyor assembly 20. In particular, each body 42 terminates distally in a hexagonal-shaped end portion 46 that slides into and/or engages with a respective hexagonal mounting hole 48 (FIG. 16) located in each side wall 20*a*, 20*b* of conveyor assembly 20. Connectors 40 each include a flange 52 and extend proximally through internal bearing assemblies 50 of roller 22. Biasing members in the form of springs 54 are coupled around outer surfaces of bodies 42, and are configured to be compressed between flanges 52 and bearing assemblies 50. In this configuration, each spring 54 pushes against a respective bearing assembly 50 and flange 52 to thereby bias each end connector 40 inwardly and against a respective axle end 30*a*, 30*b* to thus ensure end connectors 40 remain seated and/or properly engaged with axle ends 30*a*, 30*b*. Bearing assemblies 50 rotatably couple conveyor roller 22 to axle 30 and end connectors 40, thus allowing conveyor roller 22 to rotate about these components, for example, while conveyor roller 22 rotates during operation. It should be appreciated that end connectors 40 may be similarly used to rotatably couple alternative conveyor rollers to a conveyor assembly. For example, with reference to FIGS. 12-14, end connectors 40 are shown coupled to opposing ends of grooved conveyor roller 122, in which conveyor roller 122 includes similarly positioned components with similar functions as previously described with respect to conveyor roller 22, including an axle 130 with opposed axle ends 130*a*, 130*b*, and a pair of opposed ball bearing assemblies 150.

With reference to FIGS. 17-22, noise and vibration may be further reduced and/or attenuated in a conveyor assembly or assembly by outfitting or equipping a conveyor roller with tapered end roller connectors 240 having a plastic tip in accordance with a further aspect of the present invention. Tapered end connector 240 has flange 252 located between a tapered hexagonal-shaped end portion 246 and a proximal rounded end portion 242, where hexagonal-shaped end portion 246 includes a plastic tip or cap or end 256 discussed in further detail below. Tapered end connectors 240 may be used to mount a roller, such as roller 22, to frame sidewalls 20*a*, 20*b* of a conveyor assembly 20. For example, rounded portion 242 may engage bearing 50, and hexagonal end portion 246 may engage a frame sidewall 20*a*, 20*b* to mount roller 22 to sidewalls 20*a*, 20*b*. End portion 246 has a cross-sectional area that becomes smaller towards a distal end 240*a* of tapered end connector 240. The tapered and/or wedge-like shape of end portion 246 may be biased outwardly towards a frame side wall of a conveyor assembly and into engagement with a mounting hole, such as hexagonal mounting holes 48 of side walls 20*a*, 20*b*. A biasing member such as a spring may be used to bias tapered end connector 240 outwardly towards a mounting hole to ensure hexagonal end portion 246 remains engaged or wedged into the mounting hole.

The ability of tapered end connector 240 to reduce noise, vibration, harshness, and rattling between tapered end connector 240 and an adjacent sidewall of a conveyance assembly is improved due to the shock-absorbing damping tip or end 256 located at distal end 240*a* of hexagonal end portion 246. Damping end 256 includes a layer of shock-absorbing material that dampens and/or attenuates sound and vibration, and that is also preferably electrically conductive, such as a modified polypropylene material or similar plastic material. As used herein, plastic can encompass other polymers. Damping end 256 is molded over or otherwise coupled to hexagonal end portion 246 to at least partially cover and/or encapsulate an inner support structure or shaft 258 made of a rigid or durable material, such as steel, for example. As shown in FIGS. 17-20, the outer surface of damping end 256 defines the tapered hexagonal shape of hexagonal end portion 246, with the portion 253 between end 256 and flange 252 likewise being hexagonal but not being tapered in the illustrated embodiment. Damping end 256, therefore, is adapted to be inserted into the mounting holes of a conveyor assembly, such as hexagonal mounting holes 48 of conveyor assembly 20, such that the sound/vibration damping material of damping end 256 makes contact with a frame side wall of the conveyor assembly. In addition to reducing noise and vibration, damping end 256 may also reduce damage and wear to components of a conveyor assembly such as the side walls of the conveyor assembly. Accordingly, the combination of the wedge-shape and sound/vibration damping material properties of tapered end connector 240 provide for a further reduction and/or attenuation in the noise and vibration produced during the operation of a conveyor assembly.

Figure 20:
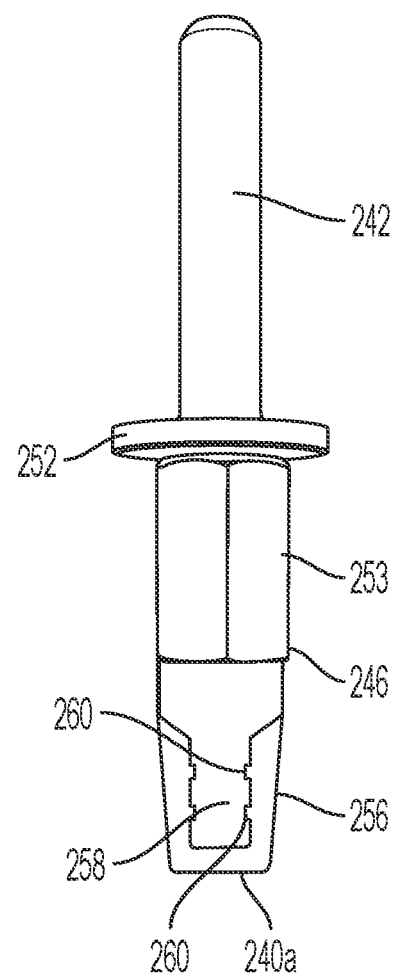
FIG. 20 is a side elevation view of the tapered end connector of FIG. 17, shown with a portion of the tapered end cut away to reveal optional grooves for engagement with a plastic tip.
Figure 21:
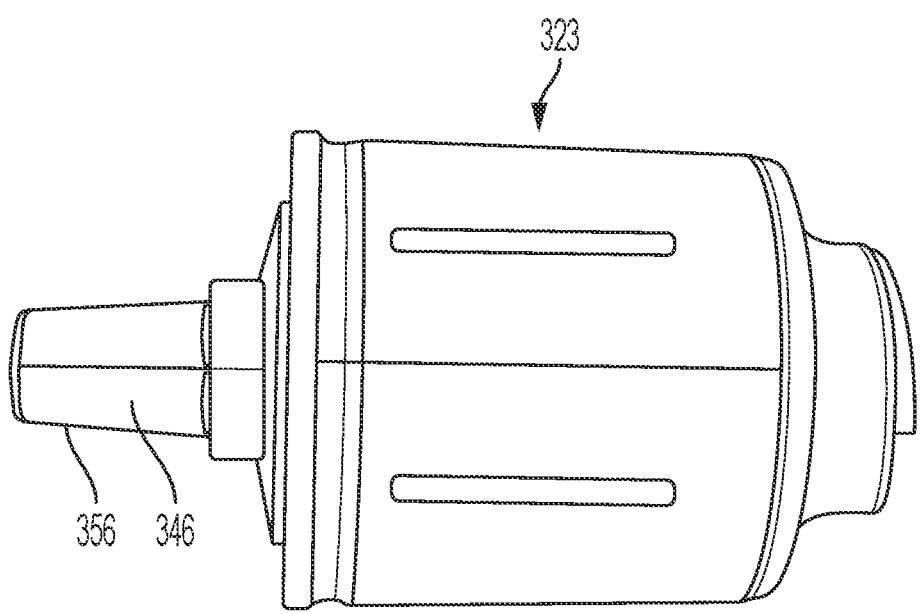
FIG. 21 is a side elevation view of a roller cartridge having a tapered end connector in accordance with an aspect of the present invention.
Figure 22:
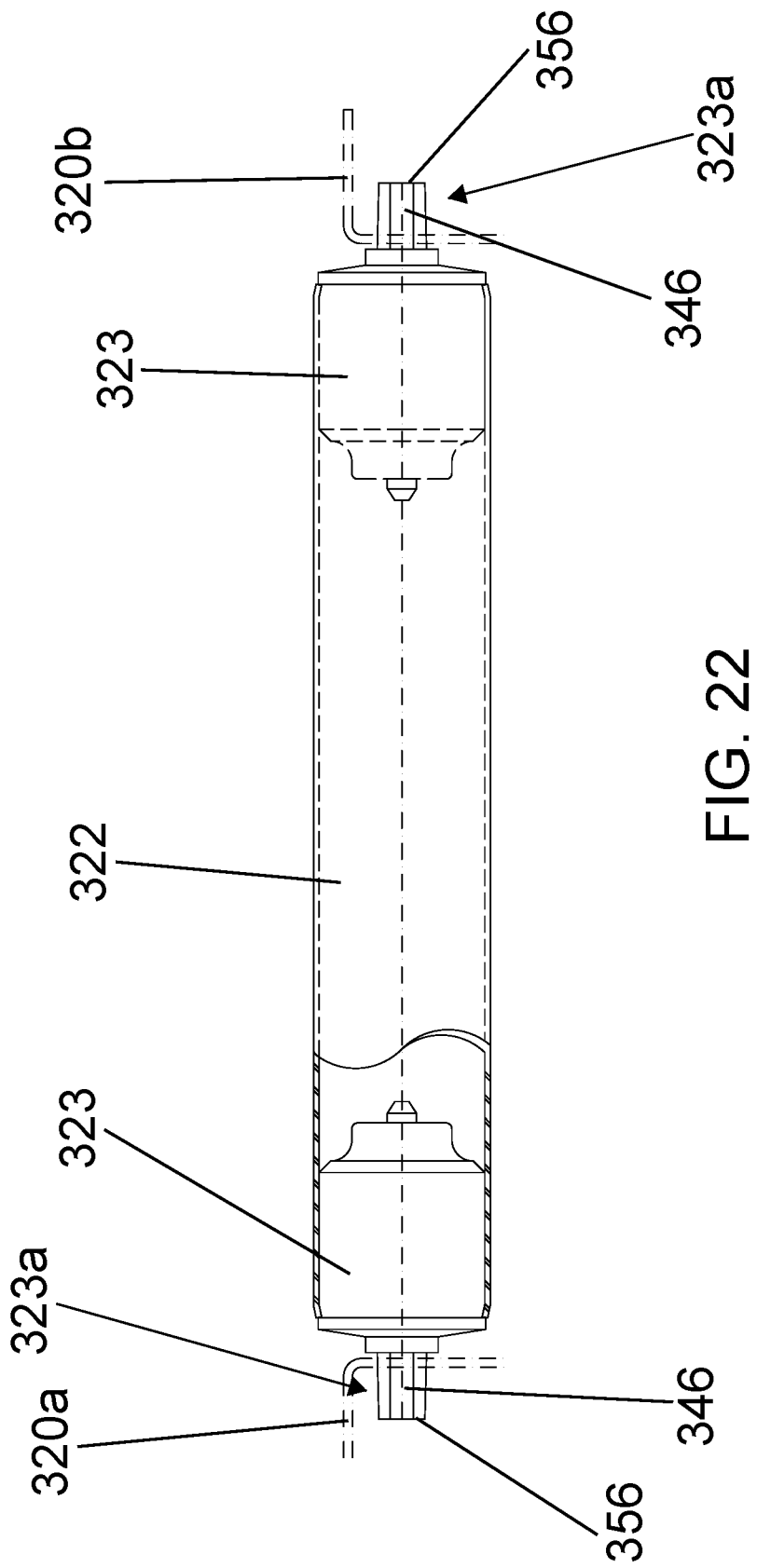
FIG. 22 is a side elevation cutaway view of another roller that is outfitted with the cartridge of FIG. 21.

With particular reference to the illustrated embodiment of FIG. 20, which discloses tapered end connector 240 with a portion of hexagonal end 246 partially cut away for illustrating the internal shaft 258 and configuration of plastic end 256 disposed over shaft 258. In the illustrated embodiment, internal shaft 258, flange 252 and rounded end 242 are unitarily constructed of a metallic material, such as steel. Shaft 258 is round and may be formed such as by machining down an initial hexagonal end portion of connector 240, with the round shaft 258 transitioning by way of an angled chamfer to the hexagonal portion 253. Also in the illustrated embodiment of FIG. 20, shaft 258 includes a pair of grooves 260 defining ribs for promoting the adhesion or securing of plastic end 246 to shaft 258. As further understood from FIG. 20, plastic end 256 is tapered whereby it decreases in size from adjacent portion 253 to end 240a. When plastic end 256 is inserted into a frame sidewall 20a, 20b, metallic support shaft 258 extends into the mounting hole of the frame sidewall 20a, 20b.

It should be appreciated that various aspects of a tapered end connector may differ apart from what has been described above. For example, an end connector may be substantially similar to the previously described end connector 40 in many or all respects with the exception that the end connector has a tapered end portion with a plastic tip as described with regard to tapered end connector 240. It should also be appreciated that a damping end may be made of a shock-absorbing material that encompasses or covers more or less of a distal end of an end connector, or that may make up the entire end portion such that there would be no internal support structure. Additionally, an end connector may have an end portion with an outer geometry that has more or less sides than a hexagon and may have a tapered angle that varies apart from what is shown in the illustrated embodiments described herein.

Furthermore, an end connector, including a tapered end connector, may take the form of or be incorporated into an assembly, such as a cartridge or similar structure that is attachable to the ends of a conveyor roller for coupling the conveyor roller to a side wall or frame of a conveyance assembly. For example, with reference to FIGS. 21 and 22, a conveyor roller 322 is shown outfitted with a pair of cartridges 323 that include internal bearing assemblies. Each cartridge 323 may be inserted into and secured at opposing ends of conveyor roller 322, in which a hexagonal end portion 346 of each cartridge 323 extends outwardly and is received by hexagonal-shaped mounting holes of side walls 320a, 320b. Similar to what has been described above with regard to tapered end connector 240, each hexagonal end portion 346 includes a plastic damping tip or end or cap 356 that is tapered such that the cross sectional area of hexagonal end portion 346 becomes smaller towards a distal end 323a of cartridge 323. Plastic end 356 is made of a shock-absorbing material as described above with regard to damping end 246, and may be over molded or otherwise coupled to an internal support structure or shaft made of steel or a similar rigid and durable material.

Accordingly, the present invention provides a sound attenuated conveyor assembly for reducing noise produced during material handling operations. A conveyor roller includes a sound damper or sound attenuating material disposed on an external surface of the roller. The damper is coupled to a reduced portion of the roller having a smaller outer diameter than that of an adjacent unreduced portion of the roller. The difference between the diameters of the reduced and unreduced portions is equivalent to the wall thickness of the sound damper, such that when the sound damper is coupled to the reduced portion, the outer diameters of the sound damper and the unreduced portion are substantially the same. Thus, the roller may be conveniently implemented into both new and existing conveyor assemblies without the need to adjust or alter a pre-existing pitch distance between adjacent rollers. Additionally, the roller may be outfitted with a pair of plastic-tipped tapered end connectors that wedge into mounting holes of the conveyance assembly to secure the roller to the conveyor assembly while further reducing noise, vibration, and harshness produced during the operation of the conveyance assembly.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A sound attenuated conveyor roller for a conveyor assembly, said sound attenuated conveyor roller comprising
   a roller body having an exterior surface, a pair of opposed ends, and an interior;
   a pair of internal bearings disposed within said interior of said roller body;
   a pair of connectors, with one connector of said pair of connectors at each of said opposed ends and each said connector engaged with a respective internal bearing of said pair of internal bearings and with a portion of each said connector extending from a respective end of said roller body, wherein said roller body is able to rotate relative to and about said connectors; and
   a sound dampening sleeve disposed over said exterior surface of said roller body, wherein said sound dampening sleeve is nonmetallic and defines an outer surface of the sound attenuated conveyor roller;
   wherein said connectors are configured for mounting said sound attenuated conveyor roller between frame side walls of said conveyor assembly.

2. The sound attenuated conveyor roller of claim 1, wherein said roller body is cylindrical.

3. The sound attenuated conveyor roller of claim 1, wherein said exterior surface defines a first outer diameter and a second outer diameter, and wherein said first outer diameter is smaller than said second outer diameter and said sound dampening sleeve is disposed over said exterior surface only at said first outer diameter.

4. The sound attenuated conveyor roller of claim 3, wherein said roller body further comprises an end portion adjacent one of said ends, and wherein said end portion comprises said second outer diameter and defines another outer surface of the sound attenuated conveyor roller.

5. The sound attenuated conveyor roller of claim 4, wherein said end portion further comprises at least one groove.

6. The sound attenuated conveyor roller of claim 4, wherein said sound dampening sleeve extends over a majority of a longitudinal length of said roller body.

7. The sound attenuated conveyor roller of claim 1, further comprising an axle extending longitudinally within said interior of said roller body, and wherein said axle comprises said pair of connectors.

8. The sound attenuated conveyor roller of claim 1, wherein said sound dampening sleeve comprises plastic.

9. The sound attenuated conveyor roller of claim 1, wherein said sound dampening sleeve comprises an annular cross section.

10. The sound attenuated conveyor roller of claim 1, wherein said portions of said connectors extending from said ends of said roller body each comprise a plurality of flat sides.

11. The sound attenuated conveyor roller of claim 1, further comprising at least one cartridge disposed within said interior of said roller body, wherein said cartridge comprises one of said pair of connectors and one of said pair of internal bearings.

12. The sound attenuated conveyor roller of claim 11, wherein said at least one cartridge comprises a pair of cartridges, and wherein one of said cartridges is disposed at each of said opposed ends of said roller body and with each one of said pair of cartridges comprising one of said pair of connectors and one of said pair of internal bearings.

13. The sound attenuated conveyor roller of claim 1, wherein said sound attenuated conveyor roller comprises a driven roller.

14. A conveyor assembly, said conveyor assembly comprising:
a pair of frame side walls that are spaced apart from one another and a plurality of sound attenuated conveyor rollers mounted to and between said frame side walls, wherein said sound attenuated conveyor rollers define a conveying surface for conveying objects, and wherein each said sound attenuated conveyor roller comprises;
a roller body having an exterior surface and a pair of opposed ends;
a pair of connectors, with one connector of said pair of connectors at each of said opposed ends and with a portion of each of said pair of connectors extending from a respective opposed end of said roller body with said roller body configured to rotate relative to and about said pair of connectors; and
a sound dampening sleeve disposed over said exterior surface of said roller body, wherein said sound dampening sleeve is nonmetallic and defines an outer surface of the sound attenuated conveyor roller;
wherein said pair of connectors of each said sound attenuated conveyor roller are mounted to respective ones of said frame side walls such that said sound attenuated conveyor rollers extend between said frame side walls.

15. The conveyor assembly of claim 14, wherein each said sound attenuated conveyor roller further comprises a pair of internal bearings disposed within an interior of said roller body, and wherein each one of said pair of connectors is engaged with a respective one of said pair of internal bearings.

16. The conveyor assembly of claim 14, wherein said roller bodies of said sound attenuated conveyor rollers are cylindrical.

17. The conveyor assembly of claim 14, wherein said exterior surface of each said sound attenuated conveyor roller defines a first outer diameter and a second outer diameter, and wherein said first outer diameter is smaller than said second outer diameter and said sound dampening sleeve is disposed over said exterior surface only at said first outer diameter.

18. The conveyor assembly of claim 17, wherein said roller bodies further comprise an end portion adjacent one of said opposed ends, and wherein said end portion comprises said second outer diameter and defines another outer surface of the sound attenuated conveyor roller.

19. The conveyor assembly of claim 18, wherein said sound dampening sleeve extends over a majority of a longitudinal length of said roller body.

20. The conveyor assembly of claim 14, wherein each said sound attenuated conveyor roller further comprises an axle extending longitudinally within an interior of said roller body, and wherein said axle comprises said pair of connectors.

21. The conveyor assembly of claim 14, wherein said sound dampening sleeve comprises plastic.

22. The conveyor assembly of claim 14, wherein said portions of each of said pair of connectors extending from respective ones of said opposed ends of said roller body comprise a plurality of flat sides.

23. The conveyor assembly of claim 14, wherein each said sound attenuated conveyor roller further comprises a pair of cartridges disposed within an interior of said roller body, wherein each one of said pair of cartridges comprises one of said pair of connectors.

24. The conveyor assembly of claim 14, wherein at least some of said sound attenuated conveyor rollers comprise driven rollers.

25. A sound attenuated conveyor roller, said sound attenuated conveyor roller comprising
a roller body having an exterior surface, a pair of opposed ends, and an interior;
a pair of bearings with one of said pair of bearings disposed at each of said pair of opposed ends of said roller body;
a pair of connectors, with one of said pair of connectors at each of said pair of opposed ends and each of said pair of connectors engaged with a respective one of said pair of bearings and with each of said pair of connectors having a portion extending from a respective opposed end of said roller body, wherein said roller body is able to rotate relative to and about said pair of connectors; and
a sound dampening sleeve disposed over said exterior surface of said roller body;
wherein said exterior surface defines a first outer diameter and a second outer diameter, and wherein said first outer diameter is smaller than said second outer diameter and said sound dampening sleeve is disposed over said exterior surface only at said first outer diameter, and wherein said sound dampening sleeve extends over a majority of a longitudinal length of said roller body.

26. The sound attenuated conveyor roller of claim 25, wherein said sound dampening sleeve comprises plastic.

27. The sound attenuated conveyor roller of claim 25, wherein said portions of each of said pair of connectors extending from said opposed ends of said roller body comprise a plurality of flat sides.

28. The sound attenuated conveyor roller of claim, 25 wherein said sound attenuated conveyor roller comprises a driven roller.

29. The sound attenuated conveyor roller of claim 25, further comprising a pair of cartridges disposed within an interior of said roller body, wherein each said cartridge comprises a bearing and one of said pair of connectors.

30. The sound attenuated conveyor roller of claim 25, wherein said roller body further comprises an end portion adjacent one of said opposed ends, and wherein said end portion comprises said second outer diameter.

* * * * *